United States Patent [19]
Larson

[11] 4,361,063
[45] Nov. 30, 1982

[54] ADAPTIVE CONTROL FOR A DIVIDING SHEAR

[75] Inventor: Duane B. Larson, Williamsville, N.Y.

[73] Assignee: Bethlehem Steel Corporation, Bethlehem, Pa.

[21] Appl. No.: 262,087

[22] Filed: May 11, 1981

Related U.S. Application Data

[63] Continuation of Ser. No. 37,553, May 9, 1979, abandoned.

[51] Int. Cl.³ .......................... B26D 5/20; G05B 19/20
[52] U.S. Cl. .......................................... 83/71; 83/76; 83/74; 83/298; 318/601; 318/603; 364/475
[58] Field of Search .................. 83/76, 298, 295, 296, 83/71, 74; 318/603, 604, 600, 601; 364/475

[56] References Cited
U.S. PATENT DOCUMENTS

| | | | |
|---|---|---|---|
| 3,176,557 | 4/1965 | Drenning et al. | 83/76 |
| 3,181,403 | 5/1965 | Sterns et al. | 83/76 |
| 3,195,385 | 7/1965 | Paterson | 83/76 |
| 3,232,157 | 2/1966 | McMath et al. | 83/76 |
| 3,581,613 | 6/1971 | Deens | 83/76 |
| 3,742,798 | 7/1973 | Gries | 83/298 |
| 4,015,183 | 3/1977 | Miyakita | 83/76 |
| 4,170,155 | 10/1979 | Saito et al. | 83/76 |
| 4,183,271 | 1/1980 | Martin | 83/295 X |
| 4,266,276 | 5/1981 | Hayashi et al. | 364/475 |

*Primary Examiner*—Donald Schran
*Attorney, Agent, or Firm*—George G. Dower; Joseph J. O'Keefe; Michael J. Delaney

[57] ABSTRACT

Driving a dividing shear to a home position after cutting a workpiece is done without oscillations at the home position. Control uses shear position feedback signal to shape nonlinearly a variable shear velocity reference signal such that no overshoot occurs. Adaptive control procedure automatically adjusts variable shear velocity reference signal to compensate for dynamic changes in cutting operation.

4 Claims, 4 Drawing Figures

ADAPTIVE CONTROL FOR A DIVIDING SHEAR

This is a continuation, of application Ser. No. 037,553, filed May 9, 1979 now abandoned.

BACKGROUND OF THE INVENTION

1. Field of the Invention

This invention relates broadly to automatic shear control. More particularly, it relates to a method and apparatus for controlling a dividing shear which makes one or more cuts into a moving workpiece during a corresponding number of shear cutting cycles. The moving workpiece may be a steel bar, as referred to below, or a steel billet, sheet, plate and the like. The term "shear cutting cycle" defines shear movement starting and ending at a home position and having a cutting position therebetween.

2. Description of the Prior Art

Contemporary hot steel bar mills roll a moving workpiece at speeds of from about 1000 to about 4000 feet per minute (305 to 1219 meters per minute). A dividing shear is used to cut a continuously moving bar into one or more lengths according to cutting order data. After each cutting cycle the dividing shear must return to its home position as rapidly as possible and be ready for the next cut. Any instability of the dividing shear control, such as oscillations and/or overshoot at the home position of a cutting cycle, results in inadequate bar length control at the aforesaid speed range. More importantly, such instability of the dividing shear may cause a cobble in the bar mill which has serious economic and operating consequences.

Heretofore, dividing shear control equipment used a velocity signal proportional to the difference between the present position of the dividing shear and its home position as an error signal to drive the dividing shear to its home position after cutting the workpiece. However, a dead band is located near the home position where no signal is sent to the dividing shear control equipment. Consequently, the dividing shear coasted beyond the dead band and generated a negative velocity control signal proportional to difference between shear present position and its home position. The negative velocity control signal caused a reversal in the dividing shear drive back toward the home position.

If the dividing shear coasted in reverse beyond the home position, a cycle was produced and in some instances a self-sustained oscillation was generated about the home position of the dividing shear operating cycle. This self-sustained oscillation, or limit cycle as is known in the control art, is the result of electrical and/or mechanical nonlinear dynamic changes brought about by changes in mill environment. For example, dynamic changes such as changes in dividing shear lag, cutting order data including bar dimensions and/or grade and other mill operating conditions may produce a control limit cycle, particularly dynamic changes in dividing shear lag.

SUMMARY OF THE INVENTION

One of the objects of this invention is to provide an improved method and apparatus for controlling a dividing shear which will overcome the foregoing difficulties.

Another object of this invention is to provide a method and apparatus for controlling a dividing shear that will prevent overshooting the home position in a cutting cycle.

Still another object of this invention is to provide a method and apparatus for controlling a dividing shear which will automatically correct for dynamic changes in workpiece cutting operations.

The foregoing objects are attainable in a dividing shear installation by employing shear drive and control means which determines a variable shear velocity reference signal as a nonlinear function of a shear position signal in such manner that when comparing this reference signal with a shear velocity feedback signal there will be no overshoot at home position during any cutting operation. An adaptive control feature of the control means is used, that is, one which senses dynamic changes in cutting operations and automatically adjusts the determined variable shear velocity reference signal to compensate for the dynamic changes.

DESCRIPTION OF THE PREFERRED EMBODIMENT

Figure 1:
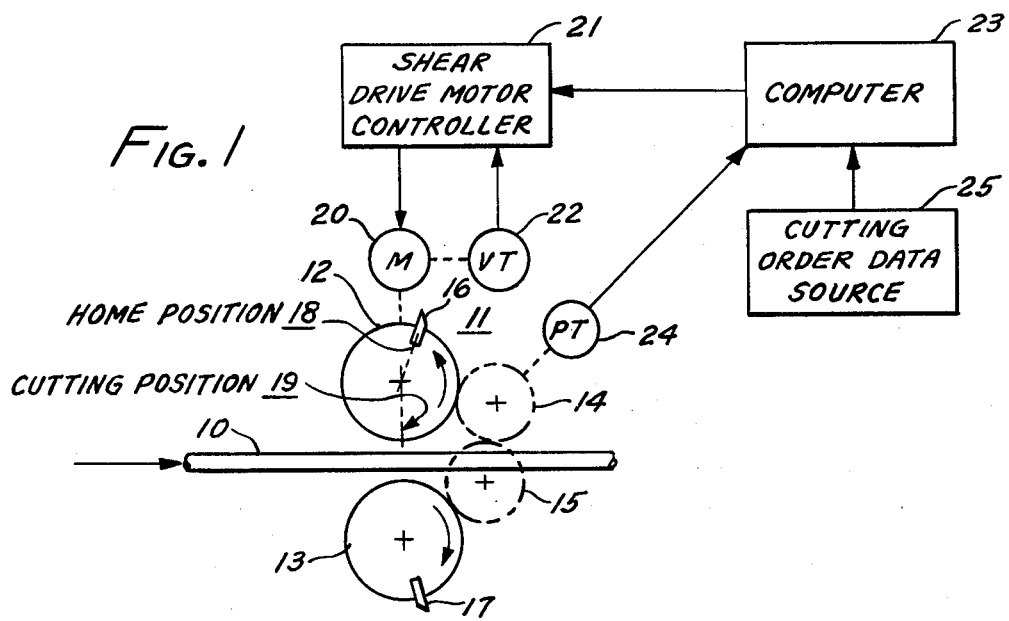
FIG. 1 is a block diagram of a bar mill type of dividing shear and control installation incorporating the present invention.
Figure 2:
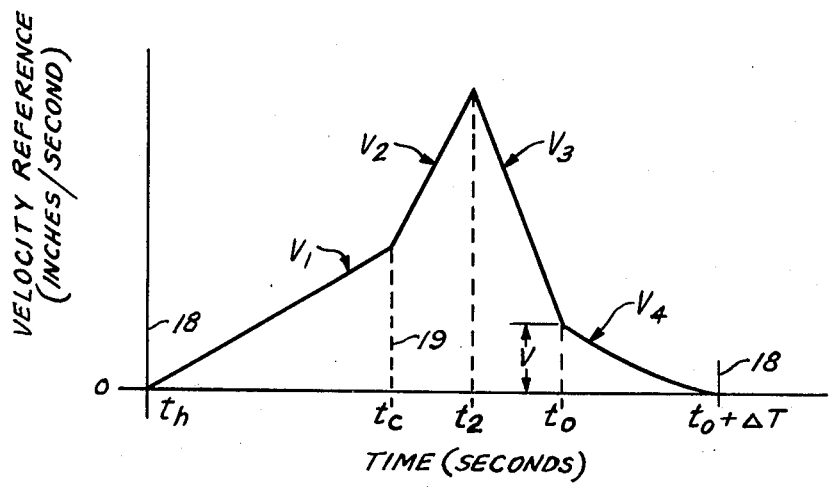
FIG. 2 is a graph showing prior art shear velocity reference signal versus time curve which is modified by nonlinear shaping of the variable shear velocity reference signal by the shear position signal in the present invention.
Figure 3:
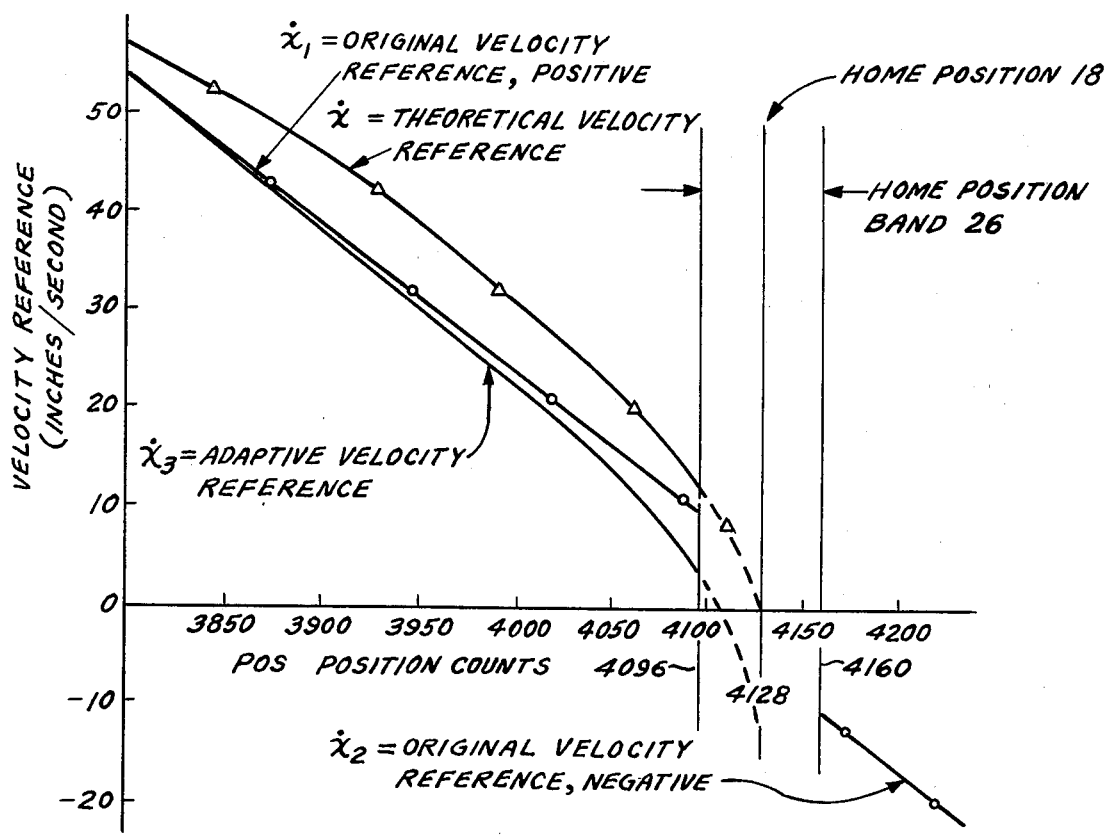
FIG. 3 is a graph showing a specific example of the nonlinear shape of the variable shear velocity reference signal versus shear position, particularly at the shear home position of the operating cycle.

Referring to FIGS. 1, 2 and 3 there is shown a shearing station in a steel bar rolling mill where moving bar 10 is guided through dividing shear 11 in the direction shown at a known but variable velocity. Dividing shear 11 cuts off the head and tail ends of moving bar 10 and the remainder into successive predetermined lengths, one bar length for each shear operating cycle. Cutting operations are done by counter-rotating cutting wheels 12, 13, driven by way of gears 14, 15, in such manner that cutting blades 16, 17 cooperate to sever moving bar 10 as rapidly as possible while the blades move at the same tangential speed as bar 10.

Each operating cycle of dividing shear 11 starts at home position 18, advances through cutting position 19 where cutting blades 16, 17 completely sever moving bar 10, and ends at home position 18. Shear drive motor 20 is mechanically coupled to cutter wheels 12, 13 through gear train 14, 15 and provides the motive power for cutting blades 16, 17 to sever moving bar 10.

A conventional variable speed shear drive motor controller 21 provides electrical current to drive motor 20. Controller 21 operates in a dividing shear speed control loop where a shear speed error signal controls the actual speed of dividing shear 11 throughout each shear operating cycle. The speed error signal is generated in controller 21 based on the algebraic sum of a shear velocity feedback signal sensed by shear velocity tachometer 22 and a variable shear velocity reference signal received from and determined by computer 23.

Computer 23 may be an individually hardwired device, or controlled by software, or be incorporated in an overall computerized process control system.

In order for computer 23 to determine the variable shear velocity reference signal, it is necessary for computer 23 to receive a shear 11 position signal in the form of a string of shear position pulses from shear position tachometer 24 and to count these pulses for each shear operating cycle. Computer 23 must also receive cutting order data signals from source 25, such signals representing moving bar 10 size, grade and desired cut length which must occur in a predetermined time interval related to the velocity of moving bar 10. These signals, together with initial cutting operation dynamic characteristics stored in computer 23, such as dividing shear lag and other mill operating conditions, are assimilated by computer 23 in calculating the variable shear velocity reference signal as a nonlinear function of the shear position signal as shown in FIGS. 2 and 3 and described below.

The variable shear velocity reference signal when compared with the shear velocity feedback signal in controller 21 will generate a speed error signal which causes dividing shear 11 to be driven to its home position without any overshoot during each shear operating cycle. Computer 23 is provided with an adaptive control feature which senses dynamic changes in initially stored values of cutting operations and automatically adjusts the calculated variable shear velocity reference signal represented in FIGS. 2 and 3 to compensate for the dynamic changes, all as described below.

Computer 23 calculates the variable shear velocity reference signal shown in FIGS. 2 and 3 based on the following broad and specific equations. Reference will be made below to a specific mill installation where dividing shear 11 has a shear position pulse count of 4096 for one revolution of cutting wheels 12, 13. For convenience, the starting home position is 32 counts, therefore the ending home position is 32+4096=4128 counts as shown in FIG. 3. Definitions for all parameters used in equations below are as follows:

POS = Shear position from home position $r_h$ measured in pulse counts.
t = Time (sec).
$t_h$ = Time of shear start from home position 18 in in operating cycle (sec).
$t_c$ = Time of shear cut at cutting position 19 in operating cycle (sec).
$t_2$ = Time of shear starting maximum deceleration (sec).
$t_o$ = Time shear velocity reference signal changes from an independent variable of time to an independent variable of position or distance (sec).
$\Delta T$ = Time to go from start of "position control" at $t_o$ to shear home position 18 (sec).
V = Shear velocity reference at time $t_o$.
$V_1$ = Shear velocity reference, linear, first acceleration between $t_h$ and $t_c$ (inches/sec).
$V_2$ = Shear velocity reference, linear, second acceleration between $t_c$ and $t_2$ (inches/sec).
$V_3$ = Shear velocity reference, linear, firing deceleration between $t_2$ and $t_o$ (inches/sec).
$V_4$ = Shear velocity reference, nonlinear, second deceleration between $t_o$ and $t_o+\Delta T$ (inches/sec) where V, $V_1$, $V_2$, $V_3$, $V_4$ are based on cutting order data, including bar speed and bar size.
$\dot{x}, \ddot{x}$ = Shear theoretical velocity reference signal (in/sec) and acceleration (in/sec$^2$). Dot and double dot indicate first and second derivative with respect to time (t).
$\dot{x}_1, \dot{x}_2$ = Shear velocity reference signal (in/sec) of the original shear velocity control curve.
$\dot{x}_3$ = Shear adaptive velocity reference signal curve (in/sec).
$c_1$ to $c_{11}$ = Constants, defined below.
$\Delta S$ = Distance to go from start of "position control" at $t_o$ to shear home position 18 (inches or position pulse counts).
$\beta$ = Adaptive control parameter, restricted in specific mill installation to $0 \leq \beta \leq 192$, nondimensional.
POS count = 9.002 inches.

Heretofore, the prior art apparatus equivalent to computer 23 was arranged to calculate only the linear portions $V_1$, $V_2$, $V_3$ of the original shear velocity reference signal $\dot{x}_1$ shown in FIG. 2. This was based on cutting order data signals representing bar 10 size, grade, desired length and the like fed from source 25. The original shear velocity reference signal is defined for t greater than or equal to $t_o$ by:

$$\dot{x}_1 = c_1(c_2 - POS) + c_3, \quad \text{(Eq. 1)}$$

where
$c_1 = 0.15$
$c_2 = 4096$, the minimum limit of home position band 26 $c_3 = 10.0$ The $V_1$ portion of the linear shear velocity reference signal $x_1$ so calculated accelerated dividing shear cutting wheels 12, 13 from zero velocity at shear home position 18 to a bar 10 speed velocity at cutting position 19 and at time $t_c$. The $V_1$ velocity equates the velocity of moving bar 10 with that of dividing shear blades 16, 17. The $V_2$ portion of signal $\dot{x}_1$ was calculated for maximum acceleration from a bar 10 velocity at cutting position $t_c$ to a maximum velocity at time $t_2$, thereby accelerating the piece cut from moving bar 10 to an initial velocity greater than that of moving bar 10. The $V_3$ portion of signal $\dot{x}_1$ was calculated for maximum deceleration from the maximum velocity at time $t_2$ to a small velocity V at time $t_o$ greater than zero, but less than the $t_c$ minimum value, so as to get dividing shear 11 near home position 18 in the minimum time.

Thus, the original shear velocity reference signal $x_1$ was terminated at a time greater than $t_o$ velocity which allowed dividing shear 11 to coast to a stop rather than being deliberately stopped. Hopefully, the shear stopped at home position 18, or within home position band 26 as shown in FIG. 3. The signal $\dot{x}_1$ is theoretically stable only in the region:

$$c_2 \leq POS \leq c_4, \quad \text{(Eq. 2)}$$

where
$c_2 = 4096$,
$c_4 = 4160$
because the original shear velocity reference signal $\dot{x}_1$ became zero at a time greater than $t_o$ and before the home position 18. In practice however, the dividing shear 11 oftimes coasted beyond shear home position 18 and the momentum thereof allowed shear 11 to travel to a position greater than POS=4160, or in other words, beyond the maximum limit of home position band 26. At this point, the equivalent of computer 23 would calculate an original negative shear velocity reference signal $\dot{X}_2$ defined by:

$$\dot{X}_2 = c_1(c_2 - POS) - c_3, \quad \text{(Eq. 3)}$$

where
 $c_1 = 0.15$,
 $c_2 = 4096$,
 $c_3 = 10.0$ which would drive dividing shear 11 backward to within home position band 26. If momentum was great enough, dividing shear 11 would coast through home position band 26 beyond the minimum limit POS=4096 shown in FIG. 3. Here computer 23 would again calculate a positive $\dot{x}_1$ signal.

At no time was there any original positive or negative shear velocity reference signal $\dot{x}_1$ or $\dot{x}_2$ existing within home position band 26 to stabilize dividing shear 11 cutting operations. Hence, there developed a limit cycle which at times became a self-sustained oscillation about shear home position 26. Consequently, either the cutting length of moving bar 10 became erratic or a cobble in the bar mill would develop when the limit cycle was great enough. Regardless of which situation occurred, severe economic losses were suffered.

By incorporating the present invention the foregoing unstable operation of dividing shear 11 will be eliminated. This is done by arranging computer 23 to calculate a variable adaptive nonlinear velocity reference signal $\dot{x}_3$. Signal $\dot{x}_3$ consists of the same linear portions $V_1$, $V_2$, $V_3$ of signal $\dot{x}_1$ shown in FIG. 2 and described above, and in addition, the variable nonlinear portion $V_4$ also shown in FIG. 2. In other words, from the time $t_h$ to time $t_o$ the variable adaptive nonlinear velocity reference signal $\dot{x}_3$ varies linearly as a function of time until it becomes less than or equal to V at $t_o$, then it becomes a nonlinear function of distance $t_o = \Delta T$ from home position 18. The $V_4$ portion is so shaped as to produce zero shear velocity and zero acceleration as dividing shear 11 approaches home position 18 as shown in FIG. 3.

A better understanding of this phenomenon will be had by developing a series of control equations for the $V_4$ nonlinear portion of the variable adaptive nonlinear velocity reference signal $\dot{X}_3$. Assume that $t_o$ at the end of $V_3$ is set equal to zero and further assume that the control equation thereafter for $t \leq t_o$, or $t_o + \Delta T$, is a quadratic in t, such as:

$$\dot{X}(t) = c_5 + c_6 t + c_7 t^2 \quad \text{(Eq. 4)}$$

Imposing the conditions:

$$c_5 = \dot{x}(o) = V, V = V_4(t_o) \quad \text{(Eq. 5)}$$

$$c_6 = \dot{x}(\Delta T) = 0.0 \quad \text{(Eq. 6)}$$

$$c_7 = \ddot{x}(\Delta T) = 0.0 \quad \text{(Eq. 7)}$$

on Eq. 4 gives the V velocity equation:

$$\dot{x}(t) = V - (2V/\Delta T)t + (V/\Delta T^2)t^2, \quad 0 \leq t \leq \Delta T, \quad \text{(Eq. 8)}$$

where $\Delta T$ is, as noted above, the time it takes for dividing shear 11 to go from $t_o$ to shear home position 18.

Dividing shear 11 position is obtained by integrating Eq. 8 and is:

$$x(t) = x(o) + Vt - (V/\Delta T)t^2 + (V/3\Delta T^2)t^3, \quad 0 \leq t \leq \Delta T. \quad \text{(Eq. 9)}$$

Thus Eq. 8 and 9 define a set of dividing shear velocity reference control equations for the variable adaptive nonlinear velocity reference signal $\dot{x}$ that will result in zero velocity and zero acceleration at shear home position 18. Equations 8 and 9 are parametric in t and have two constants, V and $\Delta T$, that determine the shape of the curves in FIGS. 2 and 3. The velocity parameter V is determined from the function given in Eq. 1 above, or for the specific example, as:

$$V = c_1(c_2 - POS) + c_3, \quad \text{(Eq. 10)}$$

where
 $c_1 = 0.15$,
 $c_2 = 4096$,
 $c_3 = 10.0$,
 POS = 3700.

The time parameter $\Delta T$ is determined from Eq. 6 as:

$$x(\Delta T) = x(0) = \Delta S = V/(\Delta T/3), \text{ or} \quad \text{(Eq. 11)}$$

$$\Delta T = 3(\Delta S/V), \quad \text{(Eq. 12)}$$

where $$\Delta S = (c_8 - POS)/POS \text{ count, inches,} \quad \text{(Eq. 13)}$$

where
 $c_8 = 4128$,
 POS count = 9.002 inches.

It can be seen that the slope $d\dot{x}/dx$ will always approach a negative infinity as the x signal approaches shear home position 18. To show this property uses the chain rule of differentiation as:

$$d\dot{x}/dx = (d\dot{x}/dt)(dt/dx) = \ddot{x}/\dot{x}. \quad \text{(Eq. 14)}$$

Substituting Eq. 8 into Eq. 14 yields, after some simplification:

$$\text{ti } d\dot{x}/dx = -2/(\Delta T - t), \quad 0 \leq t \leq \Delta T \quad \text{(Eq. 15)}$$

which approaches a negative infinity as t approaches $\Delta T$.

The above derivation proves that:
 If the dividing shear variable adaptive nonlinear velocity reference signal $\dot{x}$ has in nonlinear portion $V_4$ a zero velocity and a zero acceleration at home position 18, the velocity of the $\dot{x}$ signal curve slope must approach a negative infinity as dividing shear 11 approaches shear home position 18.

Theorem T1 was imposed on the original shear velocity reference signal $\dot{x}_1$ given in Eq. 1 by simply adding the term:

$$-\beta[(c_2 - POS) + c_9], \quad \text{(Eq. 16)}$$

where
 $c_2 = 4096$,
 $c_9 = 32$ to the original reference signal $\dot{x}_1$ to give:

$$\dot{x}_3 = c_1(c_2 - POS) + c_3 - \beta/[c_2 - POS) + c_9], \quad \text{(Eq. 17)}$$

where
 $c_1 = 0.15$,
 $c_2 = 4096$,
 $c_3 = 10.0$,
 $c_9 = 32$.

It will be observed from FIG. 3 and Eq. 17 that as POS approaches 4128, or shear home position 18, velocity reference signal $\dot{X}_3$ approaches a negative infinity and thus theorem T1 is satisfied. It will be further observed that at POS=4096, or the minimum limit of shear home position band 26, $\beta$=320. This implies that adaptive control parameter $\beta$ should be $\leq$320, otherwise a negative velocity reference signal $x_3$ would be sent by computer 23 to controller 21 before dividing shear 11 reached shear home position 18, thereby to prevent making it possible for dividing shear 11 to stop outside home position band 26. The range of $\beta$ depends upon the dynamics of dividing shear 11 including shear lag, the size and grade of bar 10 product, and other factors effected by mill environment. For the example given above, the adaptive algorithm for dividing shear 11 evolved is:

If $POS>c_4$, set $\beta=\beta+8$, where $c_4=4160$, (Eq. 18)

If $c_2 \leq POS \leq c_{10}$, set $\beta=\beta-2$, where $c_2=4096$, $c_{10}=4128$ (Eq. 19)

$\beta \leq c_{11}$, where $c_{11}=192$. (Eq. 20)

Relation 18 states that if dividing shear 11 passes shear home position 18, computer 23 increases adaptive control parameter $\beta$ by 8 so as to produce more curvature in nonlinear portion $V_4$ and cause dividing shear 11 to slow down sooner. Relation 19 is incorporated in computer 23 to slowly increase the response of dividing shear 11 if it stopped in the range of, for example, $4096 \leq POS \leq 4128$ so as to get dividing shear 11 to be in the range $4128 \leq POS \leq 4160$. Constraint in relation 20 of $\beta \leq 192$ is desirable to prevent dividing shear 11 from stepping before shear home position 18.

Ideally, if dividing shear 11 stopping remained in the interval $4128 \leq POS \leq 4160$, no change in the adaptive control parameter $\beta$ is required. However, when computer 23 calculates the shear variable adaptive nonlinear velocity reference signal $\dot{x}_3$, the adaptive control process defined by relations 18, 19, 20 is performed every shear cutting operation and is continuously adapted for changes detected in operating dynamics including shear lag, bar 10 product size and grade, and other operating variables, that would affect the value of $\beta$.

The shear variable nonlinear velocity reference signal $\dot{x}_3$ calculated by computer 24 may also be expressed alternatively in terms of the original shear linear velocity reference signal $\dot{x}_1$ as follows:

$$\dot{x}_3 = \dot{x}_1 - c_{11}/[(c_2-POS)+c_9],$$ (Eq. 21)

where
$c_{11}=192$,
$c_2=4096$,
$c_9=32$.

It will be observed from FIG. 3 that for POS$\leq$4160, the calculated alternative velocity reference signal $\dot{x}_3$ is not a function of adaptive control parameter $\beta$. The reason for this nonsymmetric alternative velocity reference signal $\dot{x}_3$ is that sufficient control of dividing shear 11 may possibly be accomplished under favorable conditions, thereby permitting using only the one-sided control relations 18, 19, 20 and that if overshoot did occur, the straight line velocity response shown in FIG. 3 would cause alternative velocity reference signal $\dot{x}_3$ to return dividing shear 11 to shear home position band 26 sooner.

FIG. 3, in addition to showing an expanded region of $3800 \leq POS \leq 4128$ of the calculated shear variable adaptive nonlinear velocity reference signal $\dot{x}_3$, also includes a theoretical shear velocity reference signal curve $\dot{x}$ which is given by Eq. 8 and 9 and may alternatively be calculated by computer 23. Theoretical velocity reference signal $\dot{x}$ is slightly higher than the adaptive velocity reference signal $\dot{x}_3$ curve also shown in FIG. 3. The reason for this difference is that the theoretical curve for signal $\dot{x}$ does not compensate for dividing shear 11 lag as does the adaptive signal $\dot{x}_3$ curve. To compensate for dividing shear lag, nonlinear differential equations that model the entire shear cutting operation would be necessary. The present adaptive control application does not need this mathematical model representing theoretical velocity reference signal x. This is because the adaptive technique of theorem T1 has the inherent ability to introduce lag into the calculated shear variable adaptive nonlinear velocity reference signal $\dot{x}_3$.

Figure 4:
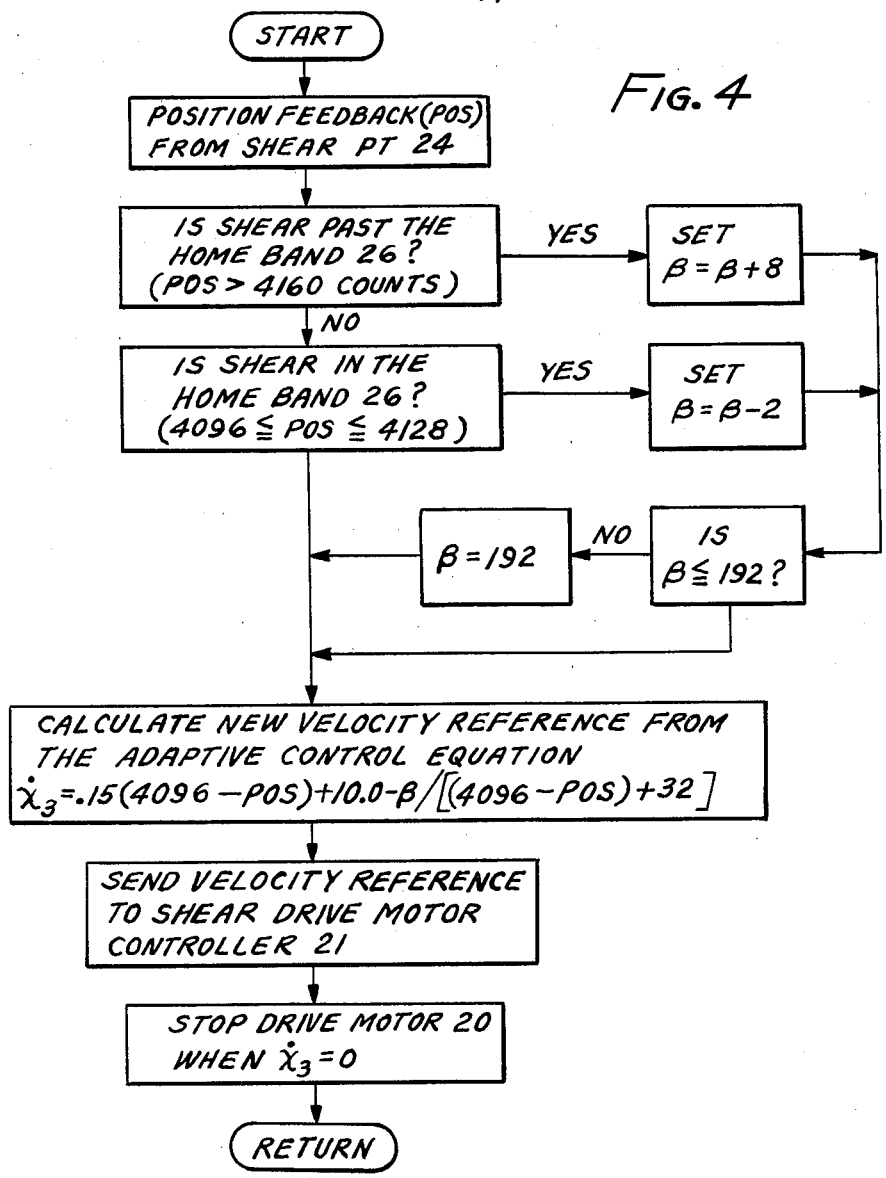
FIG. 4 is a flow chart of a control computer subroutine used in the adaptive control feature of the present invention to determine the variable shear velocity reference signal of the FIG. 3 specific example.

Reference will now be made to FIG. 4 which shows a flow chart of computer 23 sequence of calculations of the shear variable adaptive nonlinear velocity reference signal $\dot{x}_3$. It will be assumed that the dividing shear 11 installation is the same as exemplified above, that computer 23 has received cutting order data from source 25 and has provided the FIG. 2 linear portions $V_1$, $V_2$, $V_3$ of the calculated shear variable adaptive nonlinear reference signal $\dot{x}_3$, the same as the prior art equipment provided in calculating the $\dot{x}_1$ signal. Further, that computer 23 will determine the change-over point from velocity control at $t_o$ to distance control during $t_o + \Delta T$ and calculate the FIG. 2 nonlinear portion $V_4$ of velocity reference signal $\dot{x}_3$ according to equation 17. In addition, that when computer 23 uses the adaptive control feature to detect changes in shear lag and other dynamic changes in other than the alternative velocity reference signals, it will determine the range of adaptive control parameter $\beta$ according to Eq. 18, 19 and 20.

After computer 23 has fed the $V_1$, $V_2$, $V_3$ linear portions of the velocity reference signal $\dot{x}_3$ to shear drive motor controller 21 and caused dividing shear 11 to advance from home position 18, through cutting position 19 to decelerating position $t_o$, computer 23 determines the $V_4$ variable nonlinear portion of the adaptive velocity reference signal $\dot{x}_3$. This is done according to the subroutine illustrated in FIG. 4 which varies the $\dot{x}_3$ signal through shear drive motor controller 21 to cause dividing shear 11 to achieve zero velocity and zero acceleration at shear home position 18 without overshooting or oscillating.

The FIG. 4 subroutine causes computer 23 to start detecting the change-over point from shear velocity control to distance control at $t_o$ by counting POS position feedback pulses fed from shear position transmitter 24. Computer 23 determines whether dividing shear 11 is past shear home position band 26 defined by POS>4160. If yes, $\beta$ parameter is set at $\beta+8$. If no, computer 23 queries whether dividing shear 21 is within shear home position band 26 as defined by $4096 \leq POS \leq 4128$. If within band 26, $\beta$ parameter is set at $\beta-2$. A determination is made by computer 23 as to whether either of the $\beta$ parameter setting is $\leq$192. If yes, this $\beta$ setting is used below. It not, computer 23 sets $\beta$ at 192 and is used below.

The POS and $\beta$ parameters, along with predetermined constants $c_1$, $c_2$, $c_3$ and $c_9$, are used in computer 23 to calculate a new, rather than the original, variable nonlinear velocity reference signal $\dot{x}_3$ from the adaptive control Eq. 17. Computer 23 sends the variable nonlinear velocity reference signal $\dot{x}_3$ to shear drive controller 21 which energizes shear drive motor 20 as long as this signal is greater than zero. When the variable nonlinear velocity reference signal $\dot{x}_3$ becomes zero, shear drive motor 20 is deliberately stopped at shear home position 18 without overshooting or oscillating.

The adaptive control process is continuously adapted by computer 23 to change the $\beta$ parameter for each shear cut, or whenever dynamic changes in operation conditions noted above affect shear lag, for example. In each instance after a cut into moving bar 10, dividing shear 11 will return to shear home position 18 with zero velocity and zero acceleration without overshooting or oscillating.

I claim:

1. Apparatus for controlling a dividing shear capable of cutting a moving workpiece at high speed during one or more shear operating cycles, each operating cycle causing shear starting and stopping at a home position and having a cutting position therebetween, said apparatus comprising:
   (a) means for establishing each operating cycle duration and the quantity of said cycles required to make a desired number of cuts into the moving workpiece based on cutting order data;
   (b) means for driving the dividing shear through the one or more shear operating cycles under control of a shear velocity feedback signal and a variable characteristic shear velocity reference signal for each operating cycle;
   (c) first and second tachometer means for generating the dividing shear velocity feedback signal and a dividing shear position signal, respectively; and
   (d) control means including means responsive to cutting order data and the shear position signal for determining the variable characteristic shear velocity reference signal starting as linear function and converting to a nonlinear function at a predetermined shear position for each operating cycle, whereby shear velocity and acceleration are always zero at the end of each operating cycle so that the shear does not oscillate about or overshoot the home position.

2. The apparatus of claim 1 wherein means (d) includes means for sampling the shear position signal to cause conversion from a linear velocity function to a position function at the beginning of the home position band before determining the variable characteristic shear velocity reference signal.

3. The apparatus of claim 1 wherein means (d) utilizes an adaptive control procedure to automatically adjust the variable characteristic shear velocity reference signal to compensate for at least one dynamic change in cutting operations.

4. The apparatus of claim 3 wherein a dynamic change in cutting operations is a change in dividing shear lag.

* * * * *